United States Patent
Chebiyyam (10) Patent No.: US 8,353,053 B1
(45) Date of Patent: Jan. 8, 2013

(54) COMPUTER PROGRAM PRODUCT AND METHOD FOR PERMANENTLY STORING DATA BASED ON WHETHER A DEVICE IS PROTECTED WITH AN ENCRYPTION MECHANISM AND WHETHER DATA IN A DATA STRUCTURE REQUIRES ENCRYPTION

(75) Inventor: Gopi Krishna Chebiyyam, Hyderabad (IN)

(73) Assignee: McAfee, Inc., Santa Clara, CA (US)

( * ) Notice: Subject to any disclaimer, the term of this patent is extended or adjusted under 35 U.S.C. 154(b) by 630 days.

(21) Appl. No.: 12/102,526

(22) Filed: Apr. 14, 2008

(51) Int. Cl.
*G06F 7/04* (2006.01)
*G06F 17/30* (2006.01)
*G06F 15/16* (2006.01)
*G06F 12/00* (2006.01)
*G06F 12/14* (2006.01)
*G06F 13/00* (2006.01)
*G06F 21/00* (2006.01)
*H04N 7/16* (2006.01)
*H04L 29/06* (2006.01)
*H04L 9/32* (2006.01)

(52) U.S. Cl. .......... 726/30; 726/29; 726/9; 726/20; 713/159; 713/172; 713/185; 707/781

(58) Field of Classification Search .............. 726/30
See application file for complete search history.

(56) References Cited

U.S. PATENT DOCUMENTS

| | | | |
|---|---|---|---|
| 6,367,019 B1 * | 4/2002 | Ansell et al. | 726/26 |
| 6,658,566 B1 * | 12/2003 | Hazard | 713/172 |
| 6,820,204 B1 * | 11/2004 | Desai et al. | 726/6 |
| 6,957,330 B1 * | 10/2005 | Hughes | 713/163 |
| 7,194,623 B1 * | 3/2007 | Proudler et al. | 713/164 |
| 7,257,707 B2 * | 8/2007 | England et al. | 713/164 |
| 7,278,016 B1 * | 10/2007 | Detrick et al. | 713/2 |
| 7,346,778 B1 * | 3/2008 | Guiter et al. | 713/182 |
| 7,350,074 B2 * | 3/2008 | Gupta et al. | 713/157 |
| 7,350,084 B2 * | 3/2008 | Abiko et al. | 713/193 |
| 7,461,249 B1 * | 12/2008 | Pearson et al. | 713/156 |
| 7,526,654 B2 * | 4/2009 | Charbonneau | 713/188 |
| 7,653,811 B2 * | 1/2010 | Yagiura | 713/166 |
| 7,730,040 B2 * | 6/2010 | Reasor et al. | 707/690 |
| 7,877,616 B2 * | 1/2011 | Abiko et al. | 713/193 |
| 8,151,363 B2 * | 4/2012 | Smithson | 726/30 |
| 2004/0010686 A1 * | 1/2004 | Goh et al. | 713/168 |
| 2004/0199566 A1 * | 10/2004 | Carlson et al. | 709/201 |
| 2005/0289181 A1 * | 12/2005 | Deninger et al. | 707/104.1 |
| 2007/0074292 A1 * | 3/2007 | Mimatsu | 726/26 |
| 2007/0094394 A1 * | 4/2007 | Singh et al. | 709/226 |
| 2007/0101419 A1 * | 5/2007 | Dawson | 726/9 |
| 2007/0110089 A1 * | 5/2007 | Essafi et al. | 370/420 |

(Continued)

OTHER PUBLICATIONS

U.S. Appl. No. 11/840,831, filed Aug. 17, 2007.

*Primary Examiner* — Carolyn B Kosowski
(74) *Attorney, Agent, or Firm* — Wong, Cabello, Lutsch, Rutherford, & Brucculeri, LLP (57) ABSTRACT

A data loss prevention system, method, and computer program product are provided for determining whether a device is protected with an encryption mechanism before storing data thereon. In operation, data to be stored on a device is identified. Additionally, it is determined whether the device is protected with an encryption mechanism. Furthermore, there is conditional reaction, based on the determination.

17 Claims, 7 Drawing Sheets

U.S. PATENT DOCUMENTS

2007/0136593 A1* 6/2007 Plavcan et al. ................. 713/172
2007/0245148 A1* 10/2007 Buer ............................. 713/182
2008/0279381 A1* 11/2008 Narendra et al. ............. 380/270
2011/0167265 A1* 7/2011 Ahuja et al. ................... 713/168
2012/0011189 A1* 1/2012 Werner et al. ................. 709/202

* cited by examiner

COMPUTER PROGRAM PRODUCT AND METHOD FOR PERMANENTLY STORING DATA BASED ON WHETHER A DEVICE IS PROTECTED WITH AN ENCRYPTION MECHANISM AND WHETHER DATA IN A DATA STRUCTURE REQUIRES ENCRYPTION

FIELD OF THE INVENTION

The present invention relates to data loss prevention systems, and more particularly to data loss prevention systems that employ encryption mechanisms to prevent data loss.

BACKGROUND

Mobile devices such as personal digital assistants (PDAs), laptops and Smartphones are now often being used as a replacement for personal computers (PCs) in many organizations. In many cases, sensitive information associated with the organization (e.g. files, folders, etc.) may be stored on these devices. Additionally, because mobile devices often have the ability to connect to network resources intermittently, monitoring the devices, corresponding software, and stored data is a daunting security management task.

Mobile devices by nature are small, easily misplaced, and are attractive to criminal elements looking for sensitive information on unprotected machines. Thus, sensitive business information and documents are now at risk and the threats that need to be addressed with these converged devices are nearly equivalent to those of the PC. However, mobile devices often offer separate and additional functionality not found on PCs that should also be considered when addressing information security issues.

Furthermore, organizations and security professional are continuously tasked with finding better solutions for data loss prevention (DLP). Though some solutions are currently available, these solutions do not address every problems associated with DLP. For example, if a non-encrypted device is lost or stolen, unauthorized users may have the ability to view confidential data on that device, leading to data loss.

There is thus a need for overcoming these and/or other issues associated with the prior art.

SUMMARY

A data loss prevention system, method, and computer program product are provided for determining whether a device is protected with an encryption mechanism before storing data (confidential or non-confidential) thereon. In operation, data to be stored on a device is identified. Additionally, it is determined whether the device is protected with an encryption mechanism. Furthermore, there is conditional reaction, based on the determination. Whenever data loss is prevented, event(s) corresponding to such an occurrence may be sent to a management platform/console. Reports/graphs may be generated using that information. Trends may be obtained using those reports. Optionally, organizational level policies may also be envisaged/conceived using such information.

DETAILED DESCRIPTION

Figure 1:
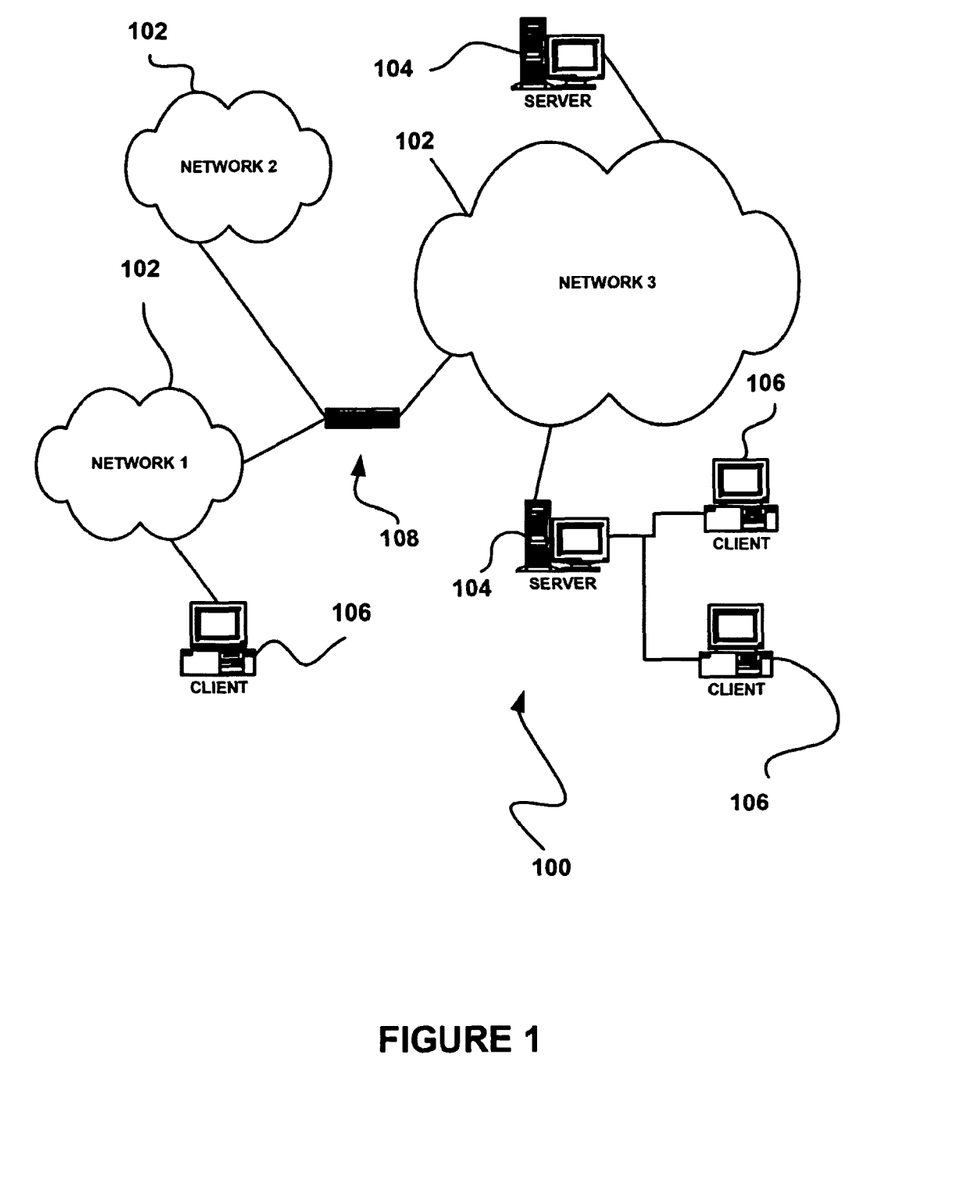
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
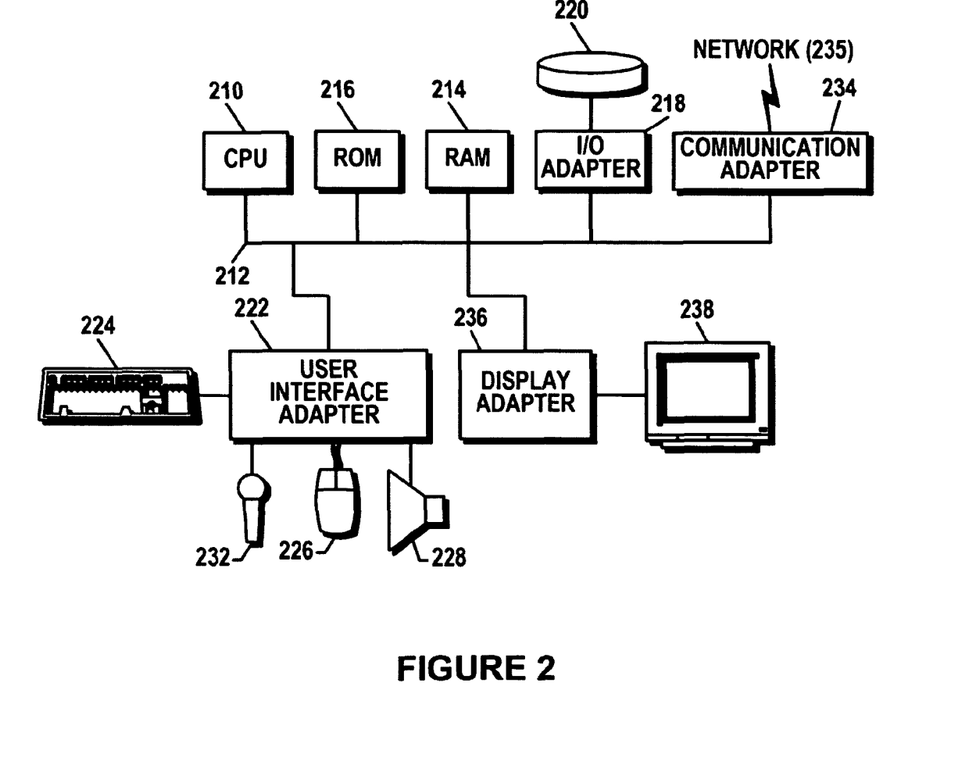
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
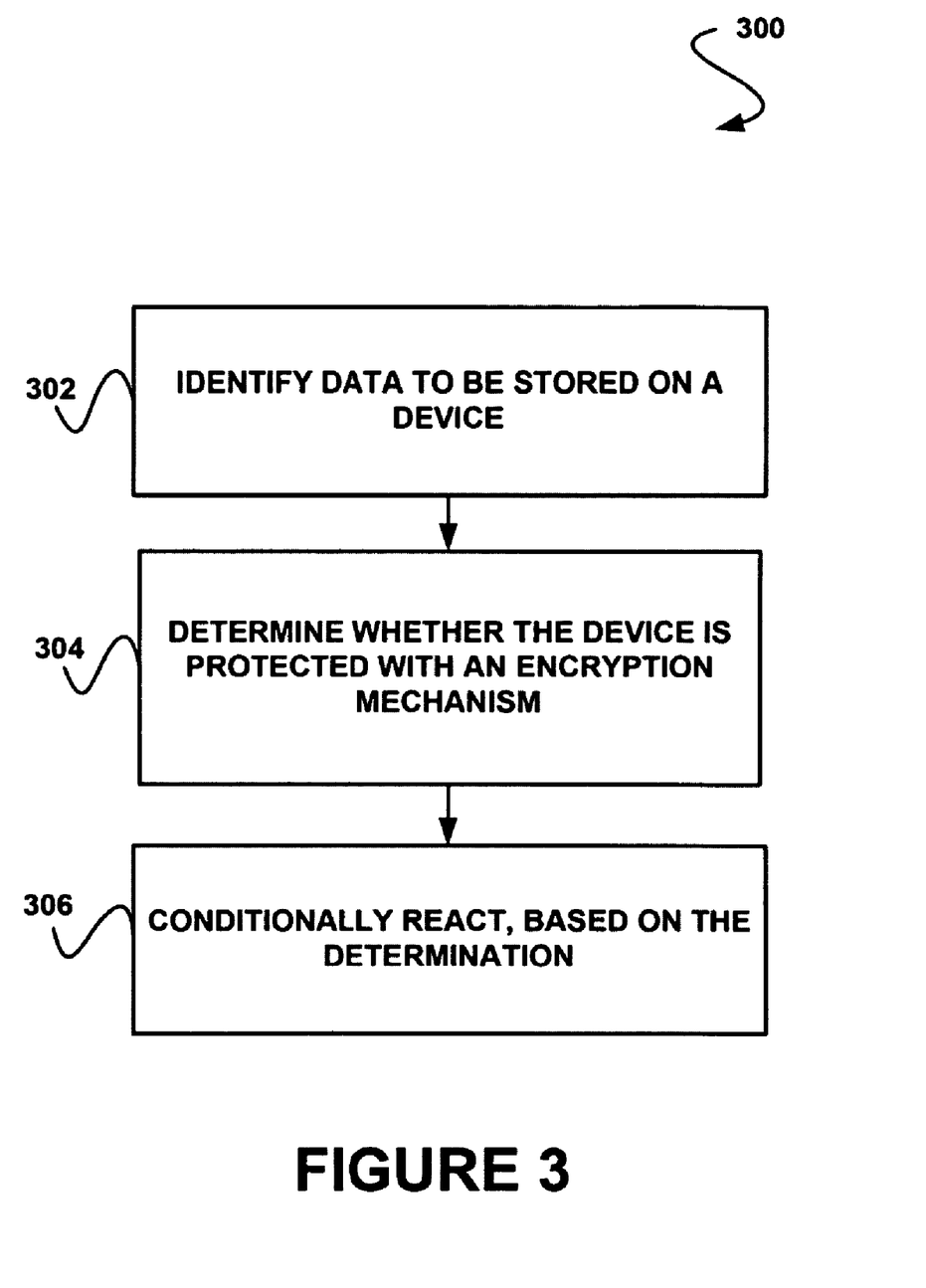
FIG. 3 shows a method for determining whether a device is protected with an encryption mechanism before storing data thereon, in accordance with one embodiment.

FIG. 3 shows a method 300 for determining whether a device is protected with an encryption mechanism before storing data thereon, in accordance with one embodiment. As an option, the method 300 may be implemented in the context of the architecture and environment of FIGS. 1 and/or 2. Of course, however, the method 300 may be carried out in any desired environment.

As shown, data to be stored on a device is identified. See operation 302. In this case, a device refers to any device capable of storing data. For example, in various embodiments, the device may include, but is not limited to, a phone, a PDA, a handheld computer, a notebook computer, a desktop computer, removable memory, a printer, and/or any other device that meets the above definition. In one embodiment, the device may include a mobile device.

Additionally, in the context of the present description, data refers to any data capable of being stored on a device. For example, in various embodiments, the data may include, but is not limited to, files, folders, documents, images, confidential information, and/or any other data capable of being stored on a device.

As shown further, it is determined whether the device is protected with an encryption mechanism. See operation 304. In the context of the present description, an encryption mechanism refers to any mechanism capable of encryption. For example, in one embodiment, the encryption mechanism may include computer code for encrypting files and/or folders and/or the hard disk.

Furthermore, there is conditional reaction based on the determination. See operation 306. In this case, the reaction may include any number of reactions. For example, in various embodiments, the reacting may include, but is not limited to, preventing storage of data on the device, displaying a message utilizing the device, sending a message to an administrator, logging the data, logging the incident/occurrence, and/or any other reaction. In one embodiment, the reaction may be conditionally performed, based on whether the data requires encryption.

As an option, the reacting may also include asking the user to obtain a token from the authority concerned (e.g. an administrator) to allow such a storage of data temporarily. As another option, the reacting may include sending at least one event to a management platform/console. In this case, reports/graphs may be generated using that information. Additionally, trends may be obtained using those reports. Optionally, organizational level policies may also be envisaged/conceived using such information.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
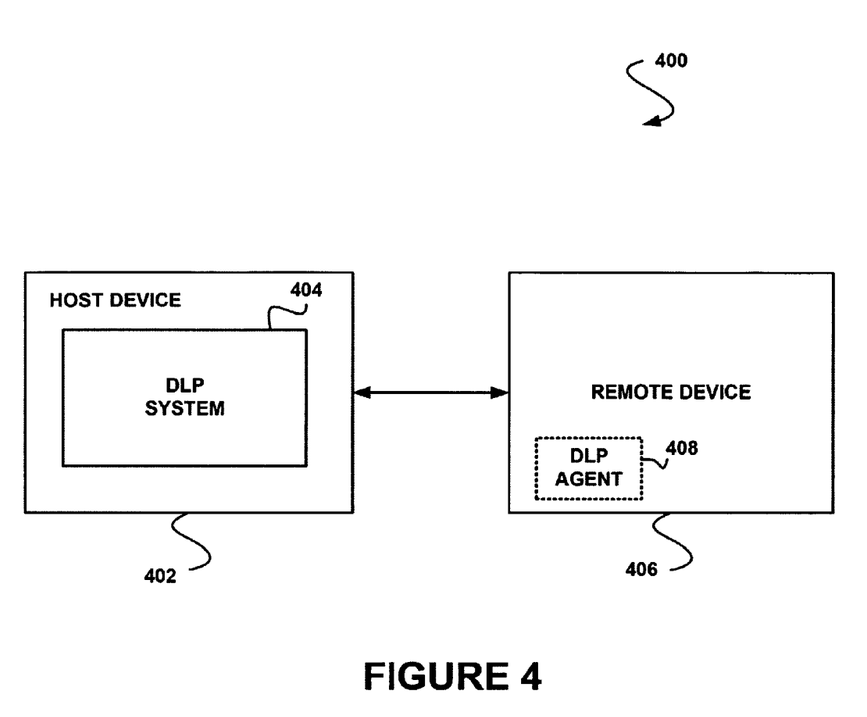
FIG. 4 shows a system for determining whether a device is protected with an encryption mechanism before storing data thereon, in accordance with one embodiment.

FIG. 4 shows a system 400 for determining whether a device is protected with an encryption mechanism before storing data thereon, in accordance with one embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a host device 402 is provided, the host device 402 including a data loss prevention (DLP) system 404. Additionally, a remote device 406 is provided. As an option, the remote device may include a DLP agent 408.

In operation, data to be stored on the host device 402 and/or the remote device 406 is identified. In this case, the data may be located on the remote device 406 or the host device 402. As an option, the data may be identified in response to a request to store data from a remote location by the remote device 406.

As another option, the data may be identified in response to a request to store data at a remote location. For example, the host device 402 or the remote device 406 may make a request to store data on the requesting device or on the device receiving the request. In this case, the request may be a user initiated request from the host device 402 or the remote device 406.

Once the data has been identified, it is then determined whether the device where the data is to be stored is protected with an encryption mechanism. In one embodiment, an agent or system located on the device to which the data is to be stored may be used to determine whether the device is protected with an encryption mechanism. In another embodiment, an operating system of the device may be used to determine whether the device is protected with an encryption mechanism. For example, the operating system may be used to determine what processes are running on the device to determine whether the device is protected with an encryption mechanism.

In still another embodiment, a program registry on the device may be used to determine whether the device is protected with an encryption mechanism. As another option, a lookup table may be used to determine whether the device is protected with an encryption mechanism. Additionally, a managing device or database may be used to manage a configuration of a plurality of devices. In this case, the managing device may be used to determine whether the device is protected with an encryption mechanism.

Still yet, computer code may be utilized for determining whether the data requires encryption. For example, it may be determined whether the data requires the encryption, based on a policy. In various embodiments, policies may be created locally and/or created using a management platform/server/console and then deployed (pushed/pulled) to the agents. In this case, the policy may be configurable. In one case, an administrator may access an interface on a server for configuring the policy.

In another embodiment, it may be determined whether the data requires the encryption, based on a data structure associated with the data. For example, certain defined data structures may be configured to require encryption. On the other hand, some data structures may be configured such that they do not require encryption. In still another embodiment, determining whether the data requires the encryption may be performed by the DLP agent 408 running on the remote device 406 or the DLP system 404 running on the host device 402.

It should be noted that the encryption mechanism may encrypt the data on the host device 402 and/or the remote device 406. Thus, the encryption mechanism may require a user to log-in, and decrypt the data in response to the log-in. In various embodiments, the login information may include a password, unique identifier, and/or any other login information.

Once it is determined whether the device where the data is to be stored is protected with an encryption mechanism, the DLP system 404 may conditionally react based on the determination. For example, the reaction may be conditionally performed, based on whether the data requires encryption.

In this case, the reaction may include any number of reactions. For example, the reacting may include preventing storage of data on the device. As another example, the reacting may include displaying a message utilizing the device.

Still yet, the reacting may include sending a message to an administrator. As another option, the reacting may include logging the data. As another option, the reacting may include logging the incident/occurrence. In one case, the data may include confidential data, and the reacting may be performed for preventing a loss of the confidential data.

As an example, the DLP system 404 or DLP agent 408 may execute on an encrypted device. In this case, the encrypted device may be the host device 402. When data is requested to be copied and/or saved onto the remote device 406 from the host device 402, the host based DLP system 404 running on the host device 402 may determine whether the destination device (i.e. the remote device 406) is encrypted with a device encryption mechanism. If the remote device 406 encrypted, the DLP system 404 may allow the copy and/or save.

If the remote device 406 is not encrypted, the DLP system 404 may not allow the copy and/or save. Furthermore, a message may be displayed indicating that copy and/or save would be allowed if the destination device is encrypted using an encryption mechanism. In this case, the message may be displayed to a user who initiated the copy and/or save.

As another example, the DLP system 404 or DLP agent 408 may execute on a non-encrypted device (e.g. the host device 402). In this case, the DLP system 404 running on the host device 402 may determine whether the host device 402 is encrypted with a device encryption mechanism. If the host device 402 is encrypted, the DLP solution system 404 may allow the copy and/or save of data (e.g. an e-mail attachment, etc.) to the host system.

If the host device 402 is not encrypted, the DLP system 404 may not allow the copy and/or save. Furthermore, a message may be displayed indicating that copy and/or save would be allowed if the host device is encrypted using an encryption mechanism. In this case, the message may be displayed to a user who initiated the copy/save.

As another example, the DLP system 404 or DLP agent 408 may execute on a non-encrypted device (e.g. the host device 402). When data is requested to be copied and/or saved onto the remote device 406 from the host device 402, the host based DLP system 404 running on the host device 402 may determine whether the destination device (i.e. the remote device 406) is encrypted with a device encryption mechanism. If the remote device 406 is encrypted, the DLP system 404 may allow the copy and/or save.

If the remote device 406 is not encrypted, the DLP system 404 may not allow the copy and/or save. Furthermore, a message may be displayed indicating that copy and/or save would be allowed if the destination device is encrypted using an encryption mechanism. In this case, the message may be displayed to a user who initiated the copy and/or save.

Figure 5:
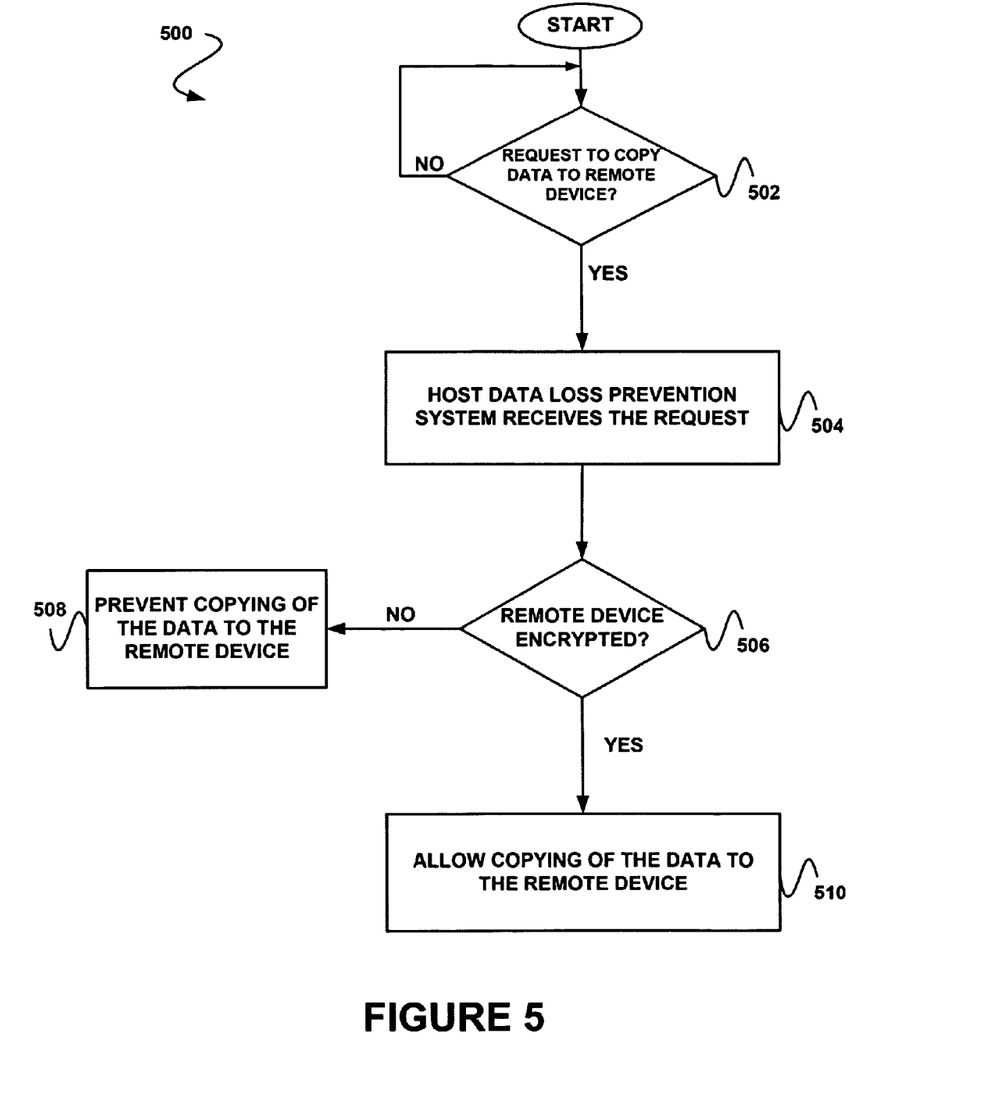
FIG. 5 shows a method for determining whether a device is protected with an encryption mechanism before storing data thereon, in accordance with another embodiment.

FIG. 5 shows a method 500 for determining whether a device is protected with an encryption mechanism before storing data thereon, in accordance with another embodiment. As an option, the method 500 may be implemented in the context of the architecture and environment of FIGS. 1-4. Of course, however, the method 500 may be carried out in any desired environment. Again, the aforementioned definitions may apply during the present description.

As shown, it is determined whether there is request to copy data to a remote device. See operation 502. If there is a request to copy data to a remote device, a host data loss prevention system receives the request. See operation 504.

It is then determined whether the remote device is encrypted. See operation 506. If it is determined that the remote device is not encrypted, the copying of the data to the remote device is prevented. See operation 508. If it is determined that the remote device is encrypted, the copying of the data to the remote device is allowed. See operation 510.

Figure 6:
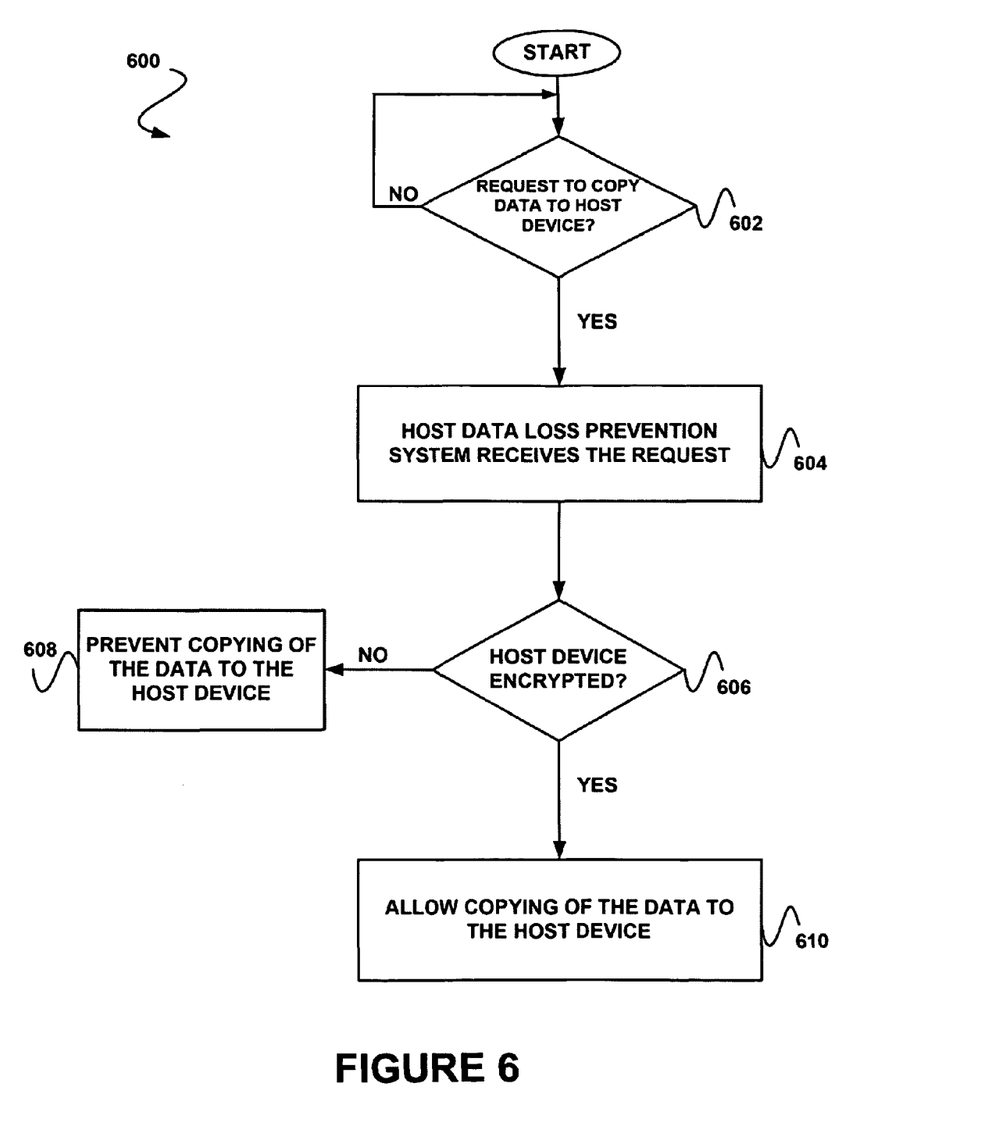
FIG. 6 shows a method for determining whether a device is protected with an encryption mechanism before storing data thereon, in accordance with another embodiment.

FIG. 6 shows a method 600 for determining whether a device is protected with an encryption mechanism before storing data thereon, in accordance with another embodiment. As an option, the method 600 may be implemented in the context of the architecture and environment of FIGS. 1-5. Of course, however, the method 600 may be carried out in any desired environment. Further, the aforementioned definitions may apply during the present description.

As shown, it is determined whether there is request to copy data to a host device. See operation 602. If there is a request to copy data to a host device, a host data loss prevention system receives the request. See operation 604.

It is then determined whether the host device is encrypted. See operation 606. If it is determined that the host device is not encrypted, the copying of the data to the host device is prevented. See operation 608. If it is determined that the host device is encrypted, the copying of the data to the host device is allowed. See operation 610.

Figure 7:
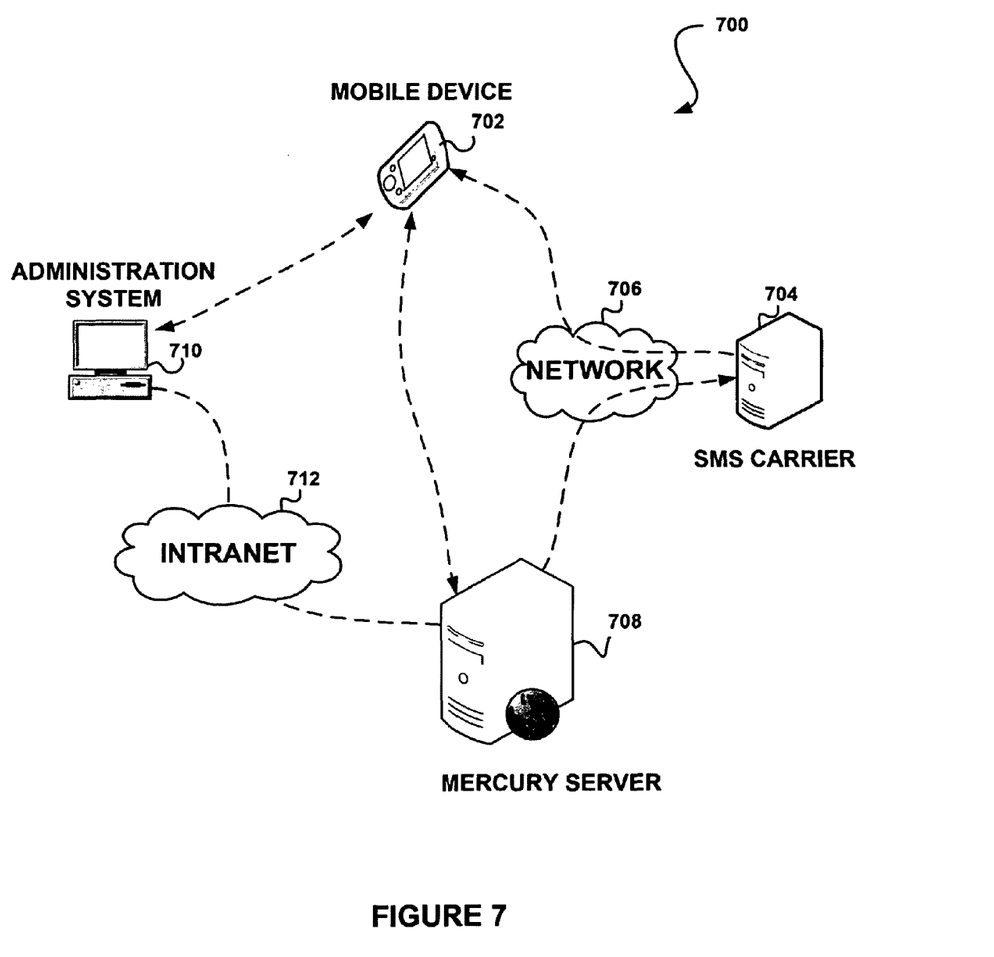
FIG. 7 shows a system for determining whether a device is protected with an encryption mechanism before storing data thereon, in accordance with another embodiment.

FIG. 7 shows a system 700 for determining whether a device is protected with an encryption mechanism before storing data thereon, in accordance with another embodiment. As an option, the system 700 may be implemented in the context of the architecture and environment of FIGS. 1-6. Of course, however, the system 700 may be implemented in any desired environment. Again, the aforementioned definitions may apply during the present description.

As shown, a mobile device 702 is in communication with a short message service (SMS) carrier 704 over a network 706. As shown further, the mobile device 702 is also in communication with a server 708. Furthermore, an administration system 710 capable of configuring the server 708 and/or the mobile device 702 is also provided. As an option, the administration system 710 may communicate with the server 708 over a network 712.

In operation, the mobile device 702 may include an encryption mechanism. In this case, when a user has been authenticated on the mobile device 702, files may be in plain text and fully viewable by the authorized user(s) and applications(s). For encryption purposes, the files may be translated into sectors and the sectors are encrypted in memory. The sectors may then be stored in non-volatile RAM (random access memory) of the mobile device 702.

In various embodiments, the encryption may occur on power down of the device, a logout, a mode change, a time out, or any other event where encryption may be desired. Using this encryption, non-authorized users may be restricted from access to files. Thus, a user may be required to enter authentication information on an authentication screen to decrypt the files.

Upon authentication, the sectors are read from the non-volatile RAM of the mobile device 702. The encrypted sectors may then be decrypted in memory and assembled into files. Upon assembly, the files may once again be fully viewable by the authorized user(s) and applications(s).

In one embodiment, the encryption may include a fully transparent Advanced Encryption Standard (AES) Federal Information Processing Standards (FIPS) 256 bit encryption. In various embodiments, the encryption may include encrypting specified files/folders, e-mails, encryption of standard application databases such as contacts, calendars, speed dials, appointments, tasks, etc.

In this case, the mobile device 702, the server 708, and/or the administration system 710 may include a DLP system. Thus, before data is copied and/or transferred to or from any of these devices, these devices may identify the data to be stored on the device, determine whether the device is protected with an encryption mechanism, and conditionally reacting based on the determination. Thus, the encryption mechanisms and the DLP systems on the devices may be used as a tiered security system directed at preventing data loss.

Additionally, various data loss prevention methods may be utilized in conjunction with the encryption mechanism and the DLP systems on the devices. For example, in the case that the data includes an image, predetermined data within the image may be used for data loss prevention. More information regarding preventing image-related data loss may be found in U.S. patent application Ser. No. 11/840,831 entitled "System, Method, And Computer Program Product For Preventing Image-Related Data Loss," filed on Aug. 17, 2007, which is incorporated herein by reference in its entirety.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer executable instructions stored thereon to cause one or more processors to:
    identify data to be permanently stored on a device;
    determine the device is to be protected with an encryption mechanism;
    determine the data is not eligible for permanent storage on the device, based on whether a data structure associated with the data requires encryption of the data;
    obtain a token, based on the data not being eligible for permanent storage on the device;
    use the encryption mechanism to encrypt the data; and
    temporarily store the encrypted data on the device based on the token.

2. The computer program product of claim 1, wherein the device includes a mobile device.

3. The computer program product of claim 1, wherein the encryption mechanism encrypts the data on the device.

4. The computer program product of claim 3, wherein the encryption mechanism requires a user to log-in, and decrypts the data in response to the log-in.

5. The computer program product of claim 1, wherein the instructions to cause one or more processors to determine the data is not eligible for permanent storage on the device comprise instructions to cause one or more processors to use a policy.

6. The computer program product of claim 5, wherein the policy is configurable.

7. The computer program product of claim 1, wherein the instructions to cause one or more processors to determine the data is not eligible for permanent storage on the device comprise instructions to cause one or more processors to use a data structure associated with the data.

8. The computer program product of claim 1, wherein the instructions to cause one or more processors to identify the data comprise instructions executed in response to a request to store data from a remote location.

9. The computer program product of claim 1, wherein the instructions to cause one or more processors to identify the data comprise instructions executed in response to a request to store data at a remote location.

10. The computer program product of claim 1, wherein the instructions to cause one or more processors to determine the device is protected with an encryption mechanism comprise instructions performed by an agent running on the device.

11. The computer program product of claim 1, further comprising instructions to cause one or more processors to display a message utilizing the device.

12. The computer program product of claim 1, further comprising instructions to cause one or more processors to send a message to an administrator.

13. The computer program product of claim 1, further comprising instructions to cause one or more processors to log the act of temporarily storing the encrypted data.

14. The computer program product of claim 1, further comprising instructions to cause one or more processors to log an incident.

15. The computer program product of claim 1, further comprising instructions to cause one or more processors to send at least one event to a management platform.

16. A method, comprising:
    identifying, by a first device, data to be permanently stored on a second device;
    determining, by the first device, the second device is protected with an encryption mechanism;
    determining, by the first device, the data is not eligible for permanent storage on the second device, based on whether a data structure associated with the data requires encryption of the data;
    obtaining a token, by the first device, based on the data not being eligible for permanent storage on the second device;
    using the encryption mechanism, by the first device, to encrypt the data; and
    temporarily storing, by the first device, the encrypted data on the second device based on the token.

17. The method of claim 16, wherein the second device includes a mobile device.

* * * * *